US011383660B2

(12) United States Patent
Tracy et al.

(10) Patent No.: US 11,383,660 B2
(45) Date of Patent: Jul. 12, 2022

(54) MATERIAL HANDLING VEHICLE HAVING A MULTI-PIECE BUMPER ASSEMBLY

(71) Applicant: The Raymond Corporation, Greene, NY (US)

(72) Inventors: Erik C. Tracy, Johnson City, NY (US); Kevin T. Bordwell, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 78 days.

(21) Appl. No.: 16/837,907

(22) Filed: Apr. 1, 2020

(65) Prior Publication Data

US 2020/0317150 A1    Oct. 8, 2020

Related U.S. Application Data

(60) Provisional application No. 62/830,107, filed on Apr. 5, 2019.

(51) Int. Cl.
*B60R 19/48* (2006.01)
*B60R 19/42* (2006.01)
(Continued)

(52) U.S. Cl.
CPC ............ *B60R 19/483* (2013.01); *B60R 19/04* (2013.01); *B60R 19/42* (2013.01); *B60R 2019/026* (2013.01)

(58) Field of Classification Search
CPC .. B60R 19/04; B60R 19/483; B60R 2019/026
(Continued)

(56) References Cited

U.S. PATENT DOCUMENTS 4,533,166 A * 8/1985 Stokes .................... B60R 19/18
267/140
4,621,849 A * 11/1986 Berfield ................ B62B 5/0006
267/140
(Continued)

FOREIGN PATENT DOCUMENTS

CN           105235618 A      1/2016
EP            1944199 A2 *   7/2008  ............. B60R 21/00
(Continued)

OTHER PUBLICATIONS

European Patent Office, Extended European Search Report for application 20167619.4, dated Jun. 9, 2020.

*Primary Examiner* — Jason S Morrow
*Assistant Examiner* — Wenwei Zhuo
(74) *Attorney, Agent, or Firm* — Quarles & Brady LLP

(57) ABSTRACT

A bumper assembly for a material handling vehicle is provided. The material handling vehicle includes a vehicle frame. The bumper assembly includes a first bumper coupled to a first side of the vehicle frame and having a first slot extending along a portion of the first bumper and a first protruding portion. The first protruding portion extends outwardly at an angle past a plane defined by the first side of the vehicle frame. The bumper assembly further includes a second bumper coupled to a second side of the vehicle frame opposite to the first side and having a second slot extending along a portion of the second bumper and a second protruding portion. The second protruding portion extends outwardly at an angle past a plane defined by the second side of the vehicle frame.

9 Claims, 10 Drawing Sheets

(51) Int. Cl.
*B60R 19/02* (2006.01)
*B60R 19/04* (2006.01)

(58) Field of Classification Search
USPC .......................................... 293/102
See application file for complete search history.

(56) References Cited

U.S. PATENT DOCUMENTS

| | | | |
|---|---|---|---|
| 5,213,383 | A | 5/1993 | Muselli |
| 6,923,483 | B2 | 8/2005 | Curry |
| 7,527,308 | B2 | 5/2009 | Buniewicz |
| 7,753,419 | B2* | 7/2010 | Kondo ................ B60R 19/483 |
| | | | 293/117 |
| 8,731,777 | B2 | 5/2014 | Castaneda |
| 8,985,649 | B2 | 3/2015 | Lutz |
| D846,599 | S | 4/2019 | Ryan |
| 10,518,728 | B2 | 12/2019 | Furumoto |
| 2005/0154530 | A1 | 7/2005 | Hosokawa |
| 2018/0057329 | A1* | 3/2018 | Poschl ............... B66F 9/07568 |
| 2018/0361968 | A1 | 12/2018 | Yatsunami |
| 2019/0339297 | A1 | 11/2019 | Charles |

FOREIGN PATENT DOCUMENTS

| | | |
|---|---|---|
| KR | 20120007652 U | 11/2012 |
| KR | 20180000925 A | 1/2018 |
| WO | 2019191572 A1 | 10/2019 |

\* cited by examiner

MATERIAL HANDLING VEHICLE HAVING A MULTI-PIECE BUMPER ASSEMBLY

CROSS-REFERENCES TO RELATED APPLICATIONS

The present disclosure is based on and claims priority to U.S. Provisional Patent Application No. 62/830,107, filed on Apr. 5, 2019, and entitled "Material Handling Vehicle Sensor Shields."

STATEMENT REGARDING FEDERALLY SPONSORED RESEARCH

Not Applicable.

BACKGROUND

Material handling vehicles have been developed to transport goods in industrial settings (e.g., warehouses, factories, etc.). For example, material handling vehicles may be driven by an operator to place goods on storage shelves and retrieve goods from the storage shelves.

BRIEF SUMMARY

The present disclosure relates generally to obstacle detection systems and, more specifically, to a multi-piece bumper assembly for a material handling vehicle.

In one aspect, the present disclosure provides a bumper assembly for a material handling vehicle. The material handling vehicle includes a vehicle frame. The bumper assembly includes a first bumper coupled to a first side of the vehicle frame and having a first slot extending along a portion of the first bumper and a first protruding portion. The first protruding portion extends outwardly at an angle past a plane defined by the first side of the vehicle frame. The bumper assembly further includes a second bumper coupled to a second side of the vehicle frame opposite to the first side and having a second slot extending along a portion of the second bumper and a second protruding portion. The second protruding portion extends outwardly at an angle past a plane defined by the second side of the vehicle frame.

In one aspect, the present disclosure provides material handling vehicle that includes a vehicle frame defining a first side, a second side extending transverse to the first side, and a third side opposite to the first side. The material handling vehicle further includes a first bumper coupled to the first side and having a first slot extending along a portion of the first bumper and a first protruding portion. The first protruding portion extends outwardly at an angle past a plane defined by the first side of the vehicle frame. The material handling vehicle further includes a second bumper coupled to a second side of the vehicle frame opposite to the first side and having a second slot extending along a portion of the second bumper and a second protruding portion, wherein the second protruding portion extends outwardly at an angle past a plane defined by the second side of the vehicle frame.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
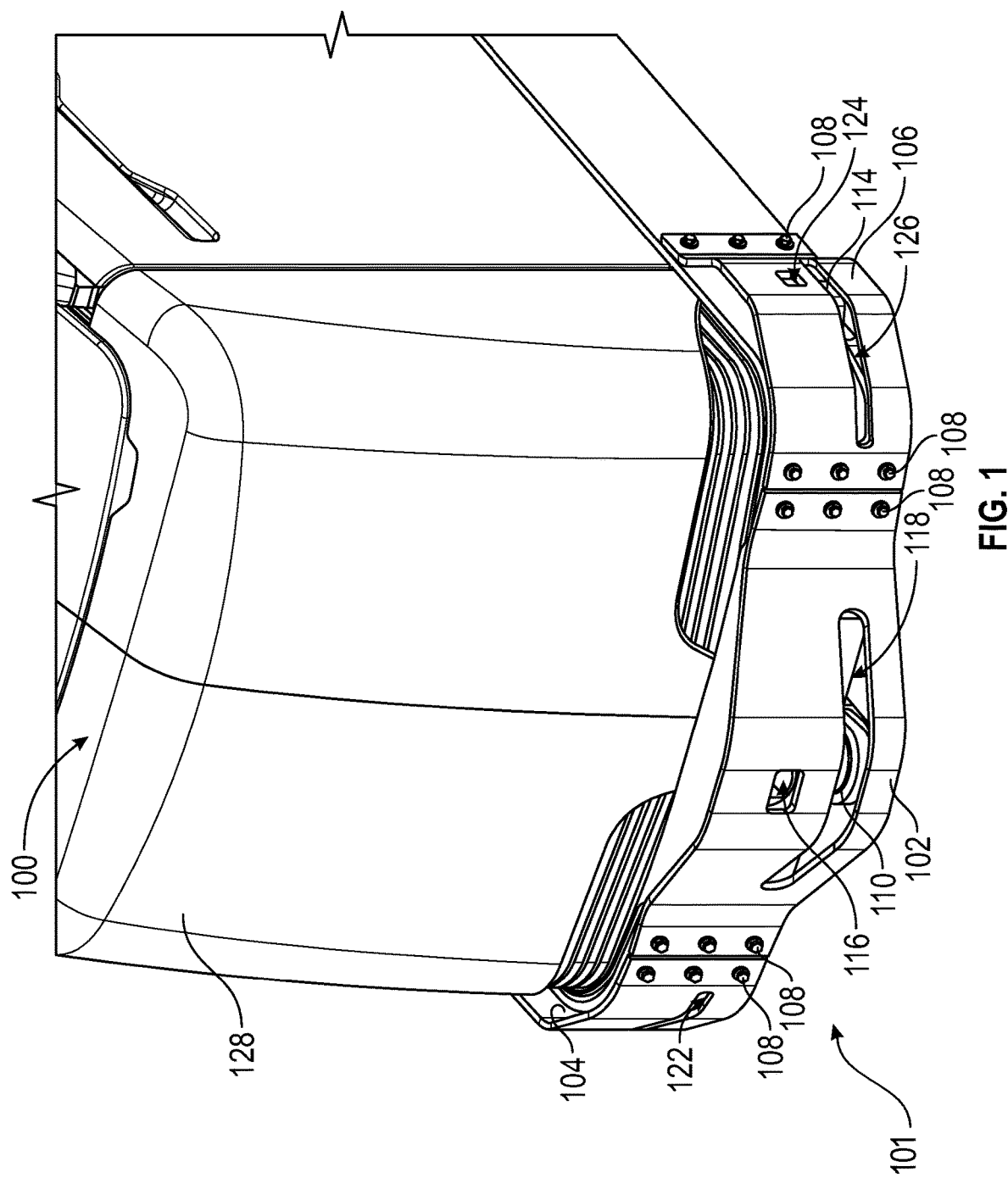
FIG. 1 is a top, back, right isometric view of a material handling vehicle having a multi-piece bumper assembly according to aspects of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is also to be appreciated that material handling vehicles are designed in a variety of configurations to perform a variety of tasks. It will be apparent to those of skill in the art that the present disclosure is not limited to any specific material handling vehicle, and can also be provided with various other types of vehicle configurations, including for example, orderpickers, swing reach vehicles, and any other lift vehicles. The various systems and methods disclosed herein are suitable for any of driver controlled, pedestrian controlled, remotely controlled, and autonomously controlled material handling vehicles.

As explained herein, the present disclosure provides a bumper assembly that includes a pair of side bumpers and a main bumper arranged between the two side bumpers. Each of the side bumpers and the main bumper can be individually attached to a lower side of a material handling vehicle (MHV) and can provide a cover for an object detection sensor or other electronic device attached to the MHV. Each of the side bumpers and the main bumper can include a slot and a cutout for the enclosed object detection sensors enclosed. The slots and cutouts may vary in size and shape to accommodate different sensor or electronics types.

In some embodiments, a sensor or other electronic device can have a display that can indicate the state of the sensor or device. The bumpers can be configured such that the sensors' display can be viewable and can be interacted with through the cutout, although the display may be viewable and interacted with through a slot as well. The sensors sensing feature can sense objects near a slot. The slot can be sized to provide access to clean a lens of a sensor, for example, without removing the bumper, and can provide access for adjustment of the level state of the sensor.

The side bumpers can be curved to match a turning radius of the MHV to avoid interference with obstacles during turning operations. For example, a multi-piece bumper assembly of the MHV may include a pair of bumpers that each define a protruding portion, which extends outwardly past a side plane defined by a vehicle frame of the MHV. Holes on lateral edges of the bumper sections may vary in number, size, and shape to accommodate different connecting configurations. The main bumper can include a top edge and a top surface that can be angled. Individual bumper sections may be removed for object detection sensor maintenance or calibration.

Figure 2:
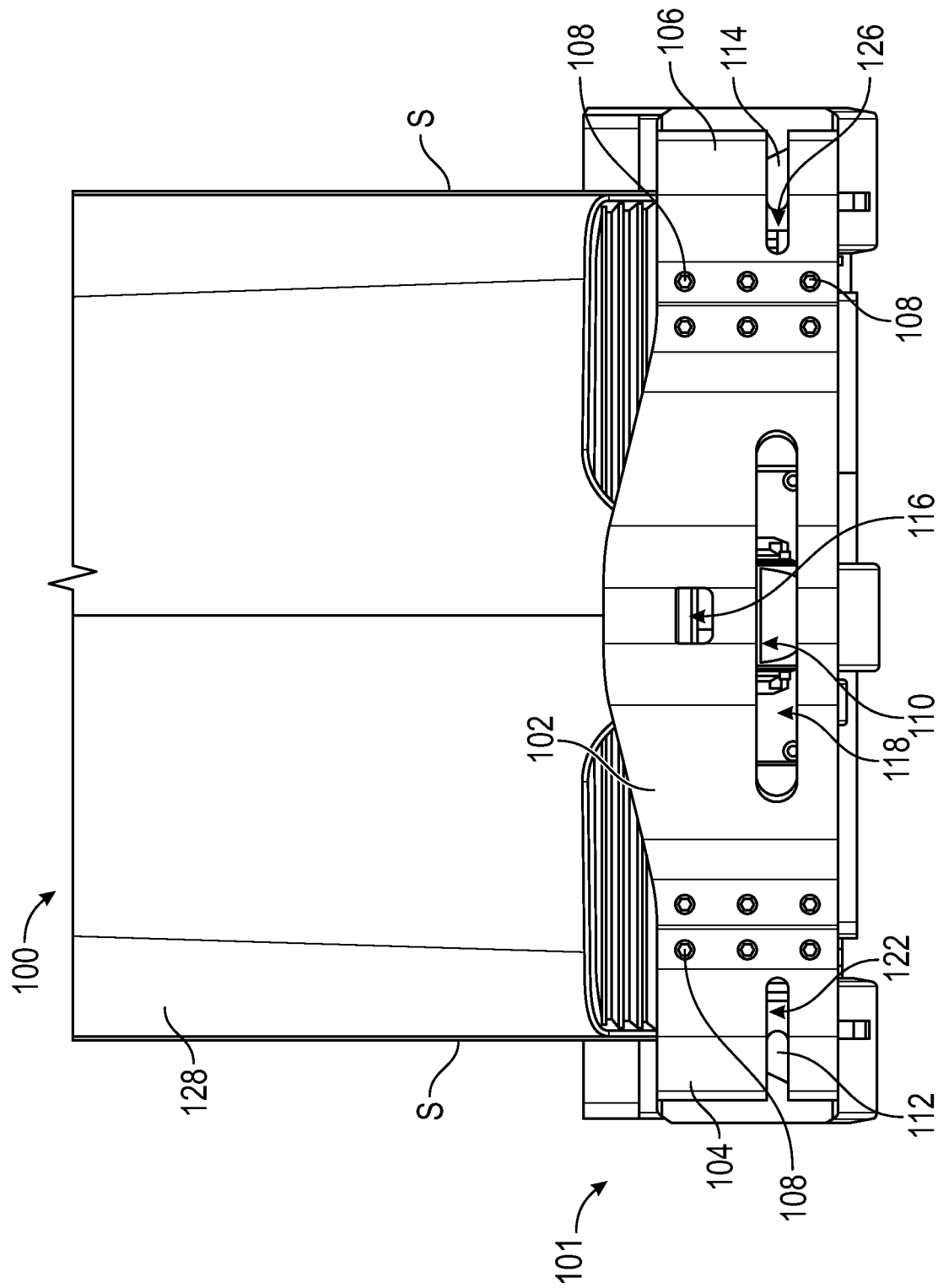
FIG. 2 is a rear view of the material handling vehicle and the multi-piece bumper assembly of FIG. 1.
Figure 3:
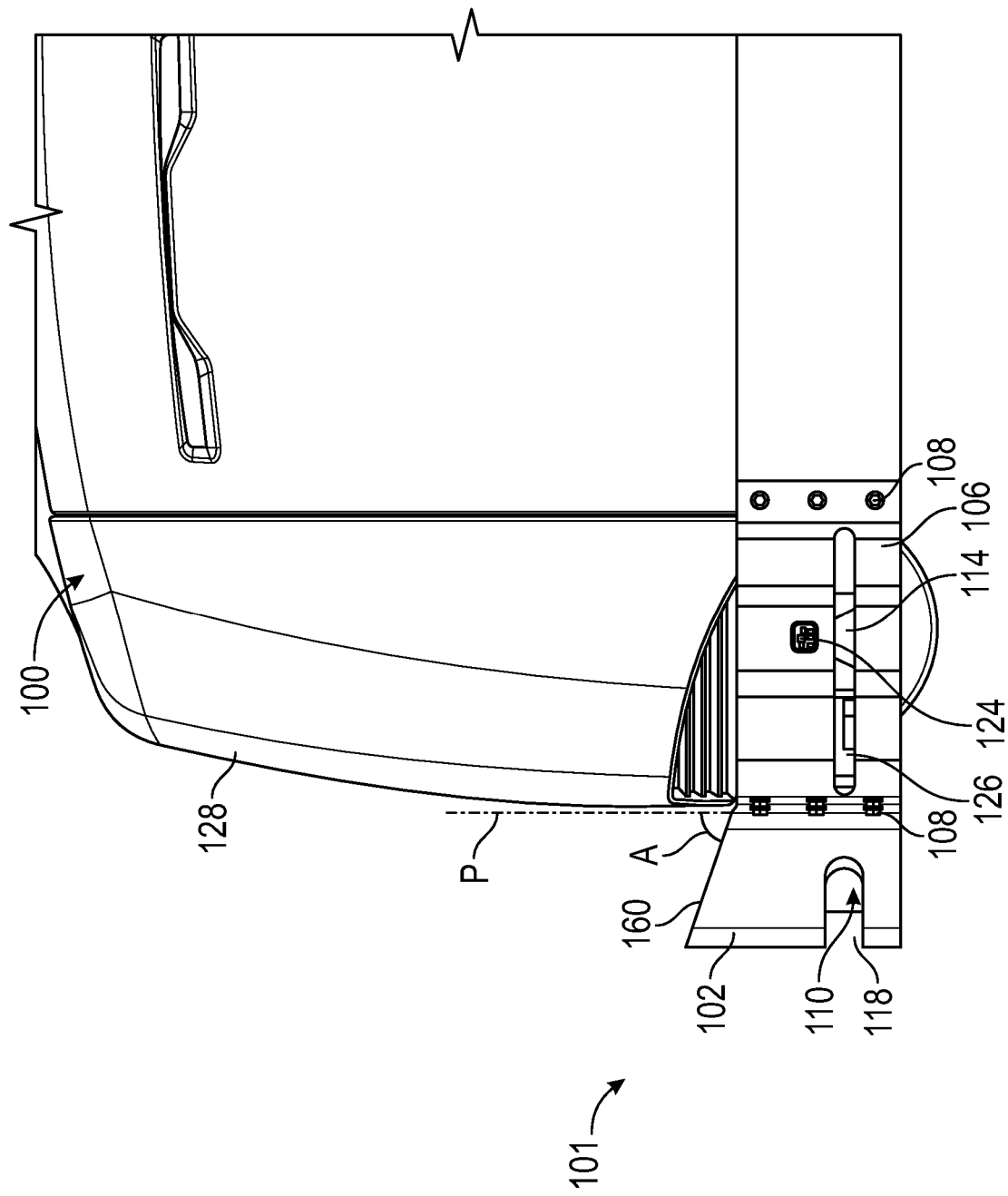
FIG. 3 is a right side view of the material handling vehicle and the multi-piece bumper assembly of FIG. 1.

With reference to FIGS. 1-3, a MHV 100 can include a cover 128 that is coupled to a vehicle frame 103. A multi-piece bumper assembly 101 can be coupled to the vehicle frame 103. In the illustrated embodiment, the multi-piece bumper assembly 101 can include a first bumper 102, a second bumper 104, and a third bumper 106. The first bumper 102 can be arranged between the second bumper 104 and the third bumper 106 (see FIG. 2). In some embodiments, the MHV 100 can be an autonomously-guided MHV.

In the illustrated embodiment, the first bumper 102 can defines a first opening 116 and a first slot 118 formed therein. The second bumper 104 can define a second opening 120 and a second slot 122. Similarly, the third bumper 106 can define a third opening 124 and a third slot 126. The first slot 118, the second slot 122, and the third slot 126 can be generally co-planar, although other slot arrangements are possible depending on the application. The first opening 116, the second opening 120, and the third opening 124 can also be generally co-planar, although other slot arrangements are possible depending on the application.

In some embodiments, the first bumper 102, the second bumper 104, and the third bumper 106 may be coupled to the vehicle frame 103 via a plurality of fasteners 108. For example, each of the first bumper 102, the second bumper 104, and the third bumper 106 may include a plurality of openings arranged at laterally-opposing sides thereof through which one of the plurality of fasteners 108 may be installed.

In the illustrated embodiment, at least of portion of each of the first bumper 102, the second bumper 104, and the third bumper 106 can extend outwardly or protrude from the vehicle frame 103. For example, a portion of the first bumper 102 can extend rearwardly from the vehicle frame 103. A portion of each of the second bumper 104 and the third bumper 106 can extend laterally outwardly from the vehicle frame 103. In general, each of the second bumper 104 and the third bumper 106 may include a protruding portion 127. The protruding portions 127 may extend outwardly past a side plane S defined by a vehicle frame 103 of the MHV 100.

In general, the outwardly-extending or protruding portions of the first bumper 102, the second bumper 104, and the third bumper 106 may provide space for one or more sensors to be housed within and covered by the multi-piece bumper assembly 101. For example, the first bumper 102 may enclose a first sensor 110, the second bumper 104 may enclose a second sensor 112, and the third bumper 106 may enclose a third sensor 114. In some embodiments, each of the first sensor set 110, the second sensor set 112, and the third sensor set 114 may be an object detection sensor that emits a signal parallel to a floor on which the MHV 100 travels.

The first sensor set 110 can be positioned between the vehicle frame 103 and the first bumper 102. The first sensor set 110 may be aligned with the first opening 116 and the first slot 118. The first sensor set 110 may sense obstacles near the MHV 100 through the first opening 116 and/or the first slot 118. The first sensor set 110 may have a sensor display that indicates a state of the sensor, and the display can be viewable and can be interacted with via the first opening 116 and/or the first slot 118.

The second sensor set 112 can be positioned between the vehicle frame 103 and the second bumper 104. The second sensor set 112 may be aligned with the second opening 120 and the second slot 122. The second sensor set 112 may sense obstacles near the MHV 100 via the second opening 120 and/or the second slot 122. The second sensor set 112 may have a sensor display that indicates a state of the sensor, and the display can be viewable and can be interacted with via the second opening 120 and/or the second slot 122.

The third sensor set 114 can be positioned between the vehicle frame 103 and the third bumper 106. The third sensor set 114 can be aligned with the third opening 124 and the third slot 126. The third sensor set 114 may sense obstacles near the MHV 100 via the third opening 124 and/or the third slot 126. The third sensor set 114 may have a sensor display that indicates a state of the sensor, and the display can be viewable and can be interacted with via the third opening 124 and/or the third slot 126.

Figure 4:
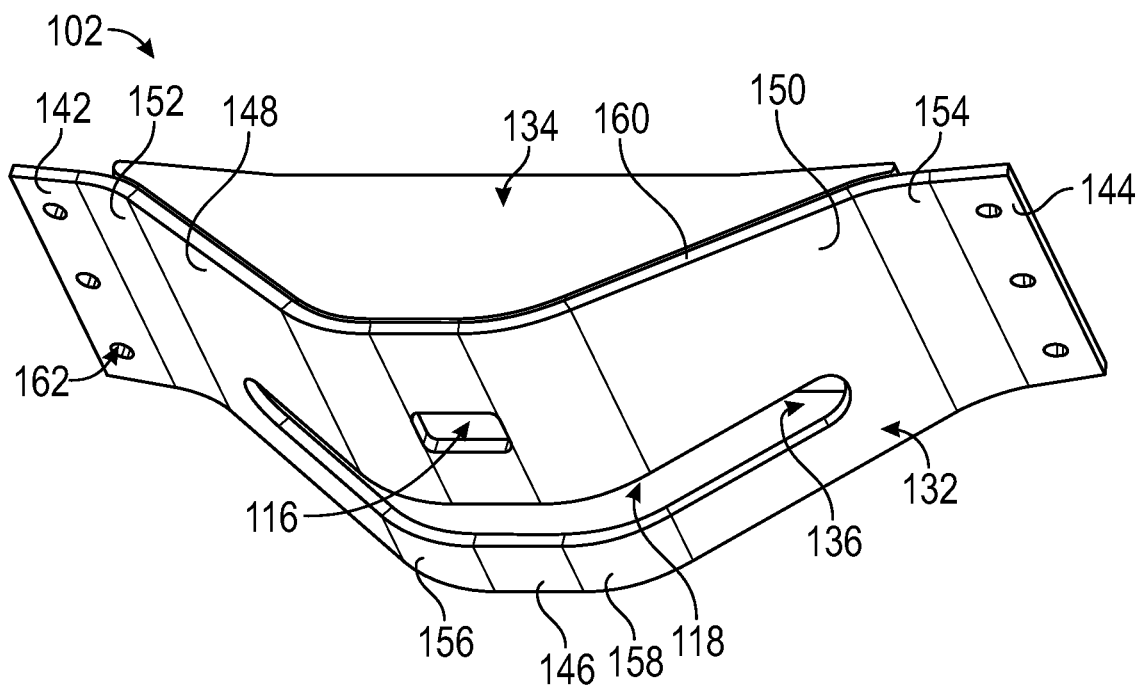
FIG. 4 is a top, front, left isometric view of a first bumper of the multi-piece bumper assembly of FIG. 1.
Figure 5:
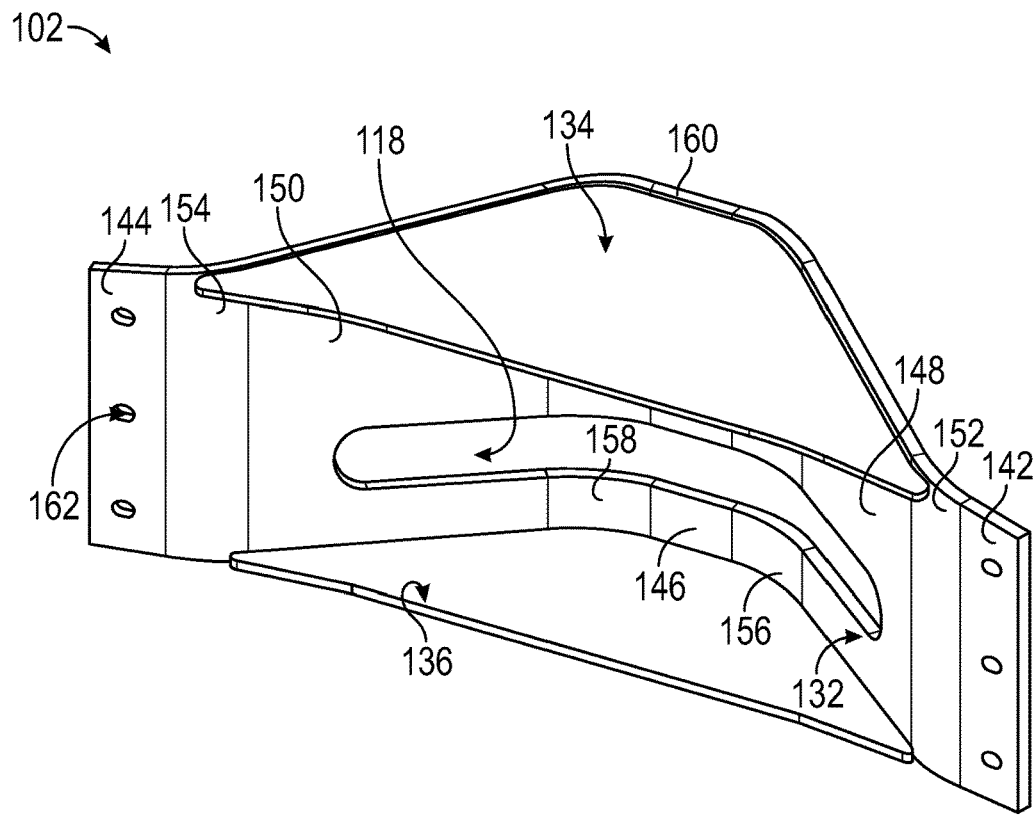
FIG. 5 is top, back, right isometric view of the first bumper of FIG. 4.

With reference to FIGS. 3-5, the first bumper 102 can include a first plate 132, a second plate 134, and a third plate 136. The first plate 132 can include a first end portion 142, a second end portion 144, a middle portion 146, a first sloped portion 148, a second sloped portion 150, a first transition portion 152, a second transition portion 154, a third transition portion 156, a fourth transition portion 158, and an upper edge 160. The second plate 134 and the third plate 136 may extend from opposing edges of the first plate 132 in a direction toward the vehicle frame 103. The first end portion 142 and the second end portion 144 can each define a plurality of fastener openings 162 through which the plurality of fasteners 108 may be installed.

In some embodiments, the first plate 132 can be joined to the second plate 134 and the third plate 136 (e.g., welded, adhered, riveted, fastened, etc.). In some embodiments, the first plate 132, the second plate 134, and the third plate 136 can be integral with one another (e.g., formed from a single piece of material via casting, molding, etc.). The first end portion 142 can be connected to the first transition portion 152. The first transition portion 152 can be connected to the first sloped portion 148. The first sloped portion 148 can be connected to the third transition portion 156. The third transition portion 156 can be connected to the middle portion 146. The middle portion 146 can be connected to the fourth transition portion 158. The fourth transition portion 158 can be connected to the second sloped portion 150. The second sloped portion 150 can be connected to the second transition portion 154. The second transition portion 154 can be connected to the second end portion 144.

In some embodiments, the first transition portion 152 and the second transition portion 154 can be concave. In some embodiments, the third transition portion 156 and the fourth transition portion 158 can be convex. The first sloped portion 148 and the second sloped portion 150 may taper outwardly and extend toward the middle portion 146. When the first bumper 102 is coupled to the vehicle frame 103, the first sloped portion 148 and the second sloped portion 150 may extend or protrude away from the vehicle frame 103 (see FIGS. 1 and 3).

In some embodiments, the first plate 132 can be generally bell-shaped. The second plate 134 and the third plate 136 can be generally trapezoidal to complement and correspond with the first plate 132. The third plate 136 can be generally perpendicular with the first plate 132. In some embodiments, the second plate 134 and the third plate 136 are generally parallel with one another. In some embodiments, the second plate 134 is angled relative to the third plate 136. In some embodiments, the second plate 134 is generally parallel with the upper edge 160. The second plate 134 and the third plate 136 can be joined to the first transition portion 152, the first sloped portion 148, the third transition portion 156, the middle portion 146, the fourth transition portion 158, the second sloped portion 150, and the second transition portion 154 of the first plate 132.

In some embodiments, the upper edge 160 and the second plate 134 may be angled relative to the floor on which the MHV 100 travels. For example, in some embodiments, an angle A defined between the upper edge 160/the second plate 134 and a plane P arranged perpendicular to the floor on which the MHV 100 travels can be generally acute, as depicted in FIG. 3. In some embodiments, the angle A defined between the upper edge 160/the second plate 134 and the plane P can be generally obtuse. In some embodiments, the angle A may be a non-right angle.

With reference to FIG. 4, in some embodiments, the first opening 116 can be defined in the middle portion 146 between the second plate 134 and the third plate 136. In some embodiments, the first opening 116 can be rectilinear. It should be understood that the first opening 116 may be any shape (e.g., polygonal, ovular, ovate, circular, etc.). It should also be understood that the first opening 116 may be defined by additional portions of the first plate 132 in addition to or instead of the middle portion 146.

With reference to FIGS. 4 and 5, in some embodiments, the first slot 118 can be defined in the first sloped portion 148, the third transition portion 156, the middle portion 146, the fourth transition portion 158, and the second sloped portion 150 between the second plate 134 and the third plate 136. In some embodiments, the first slot 118 can be a straight-sided oval. It should be understood that the first slot 118 may be any shape (e.g., polygonal, rectilinear, ovate, circular, etc.). It should also be understood that the first slot 118 may be defined by additional portions of the first plate 132 in addition to or instead the first sloped portion 148, the third transition portion 156, the middle portion 146, the fourth transition portion 158, and the second sloped portion 150.

Figure 6:
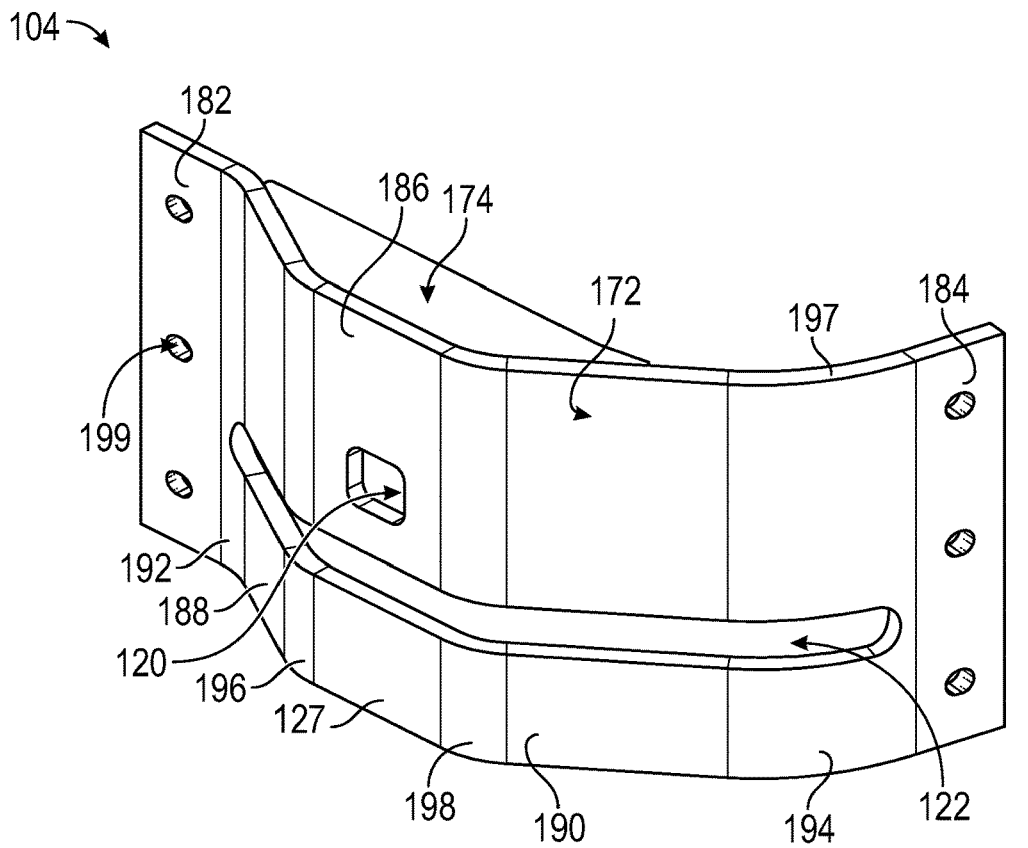
FIG. 6 is a top, front, left isometric view of a second bumper of the multi-piece bumper assembly of FIG. 1.
Figure 7:
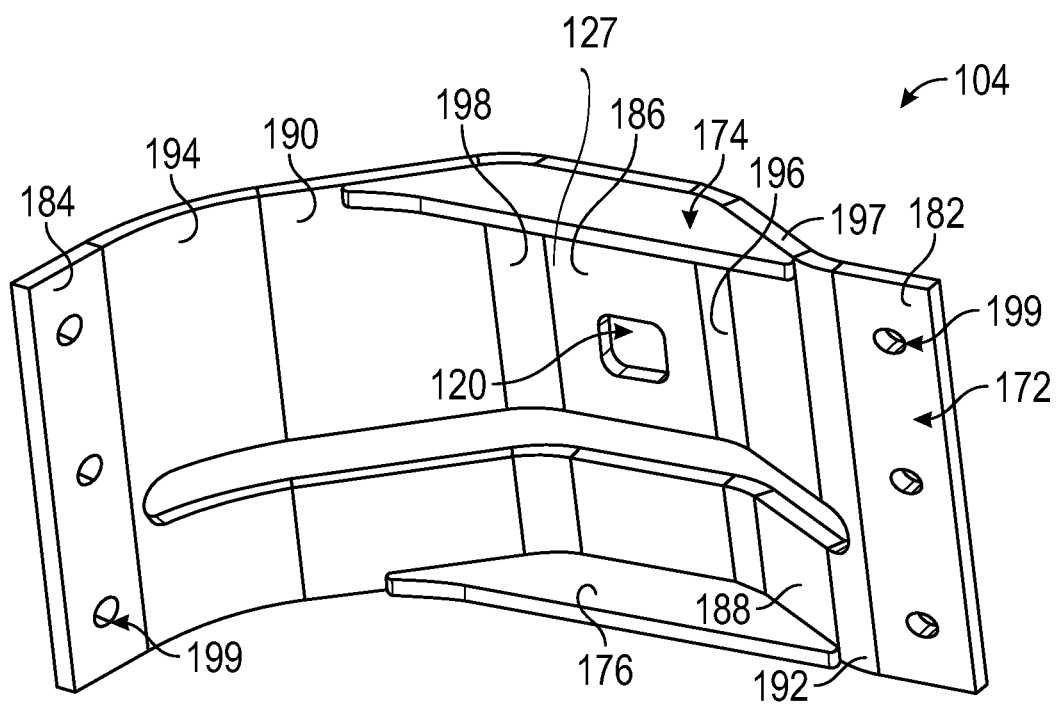
FIG. 7 is a top, back, right isometric view of the second bumper of FIG. 6.
Figure 8:
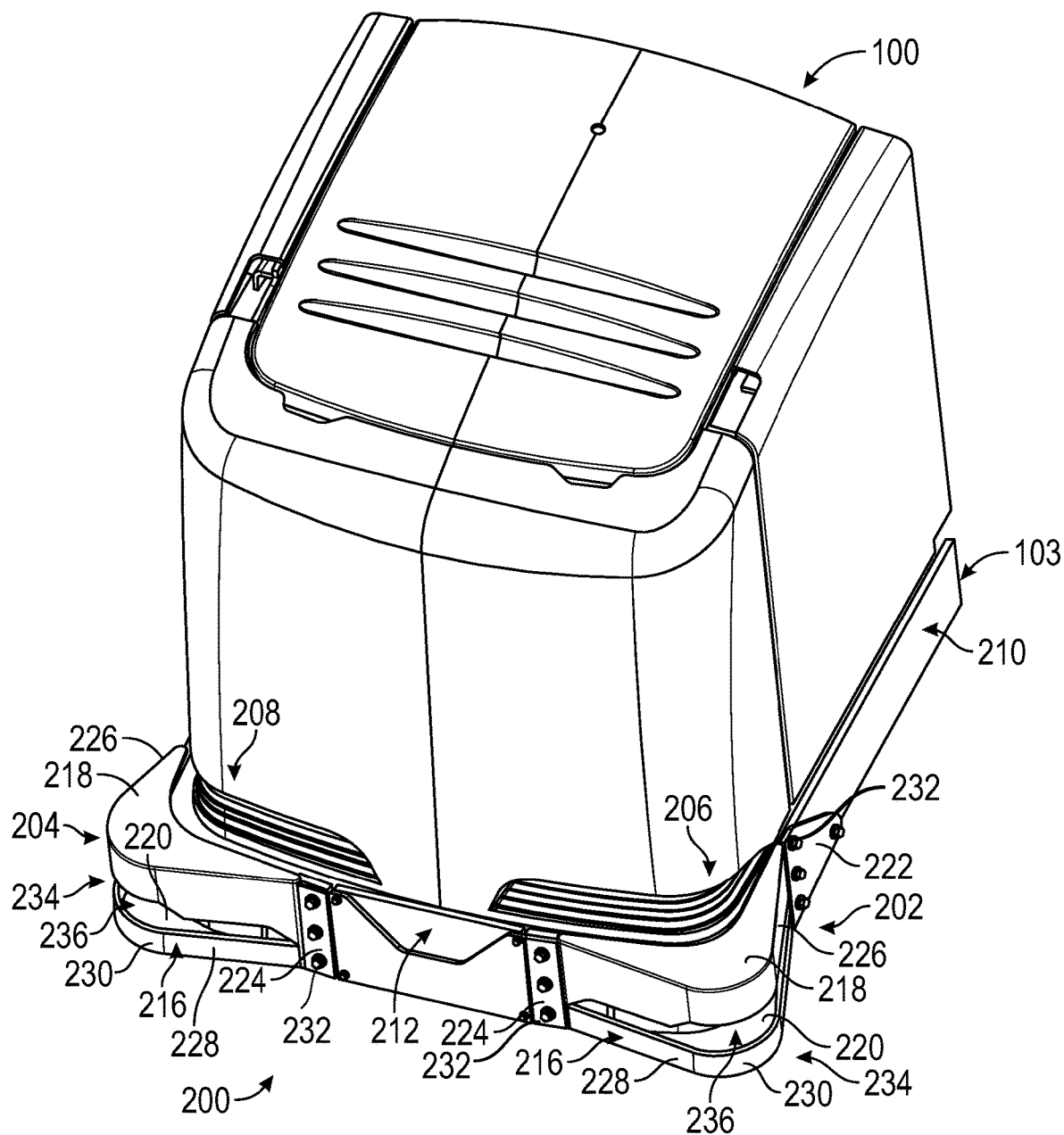
FIG. 8 is a top, back, right isometric view of a material handling vehicle having another multi-piece bumper assembly according to aspects of the present disclosure.
Figure 9:
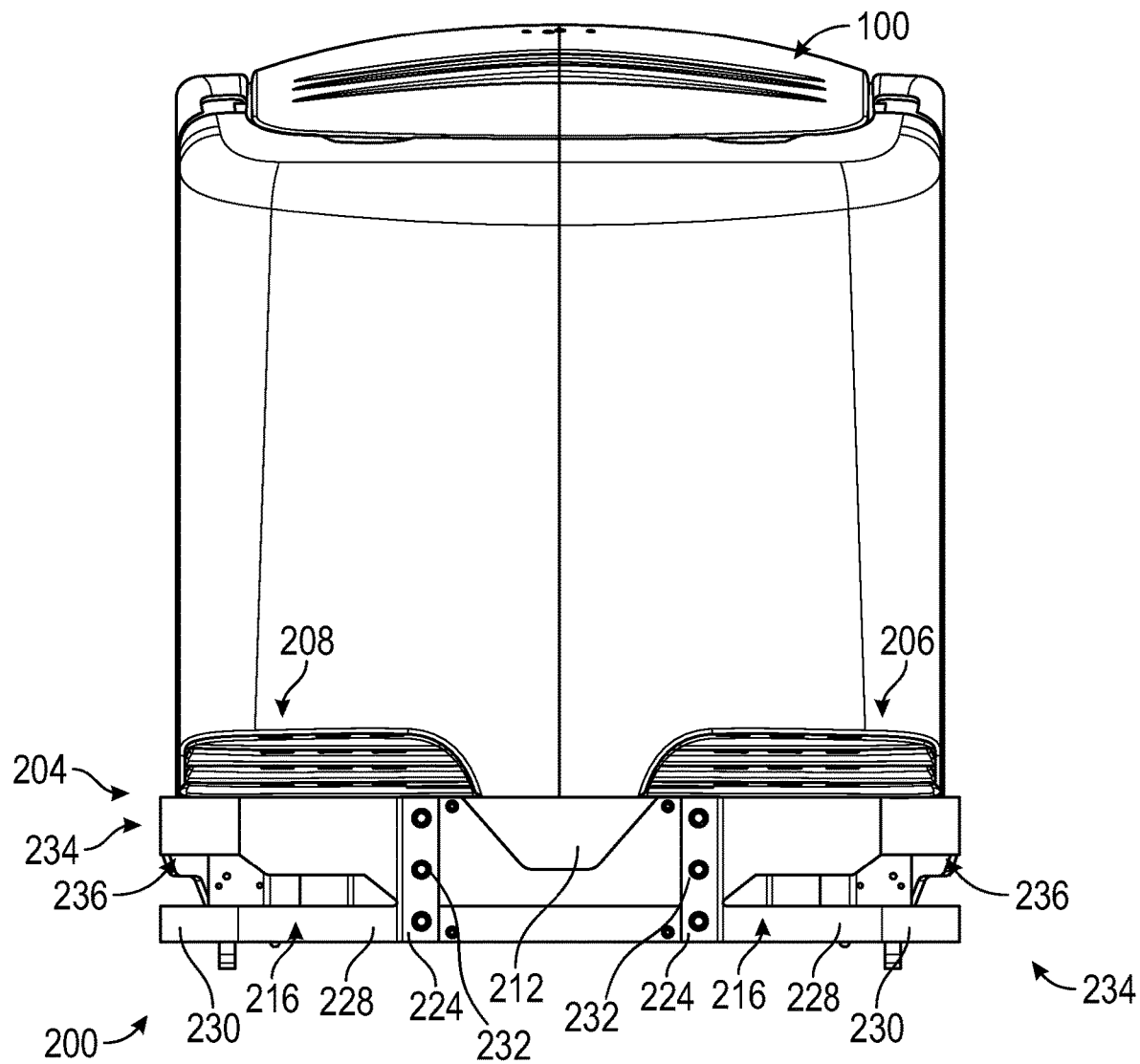
FIG. 9 is a rear view of the material handling vehicle and the multi-piece bumper assembly of FIG. 8.
Figure 10:
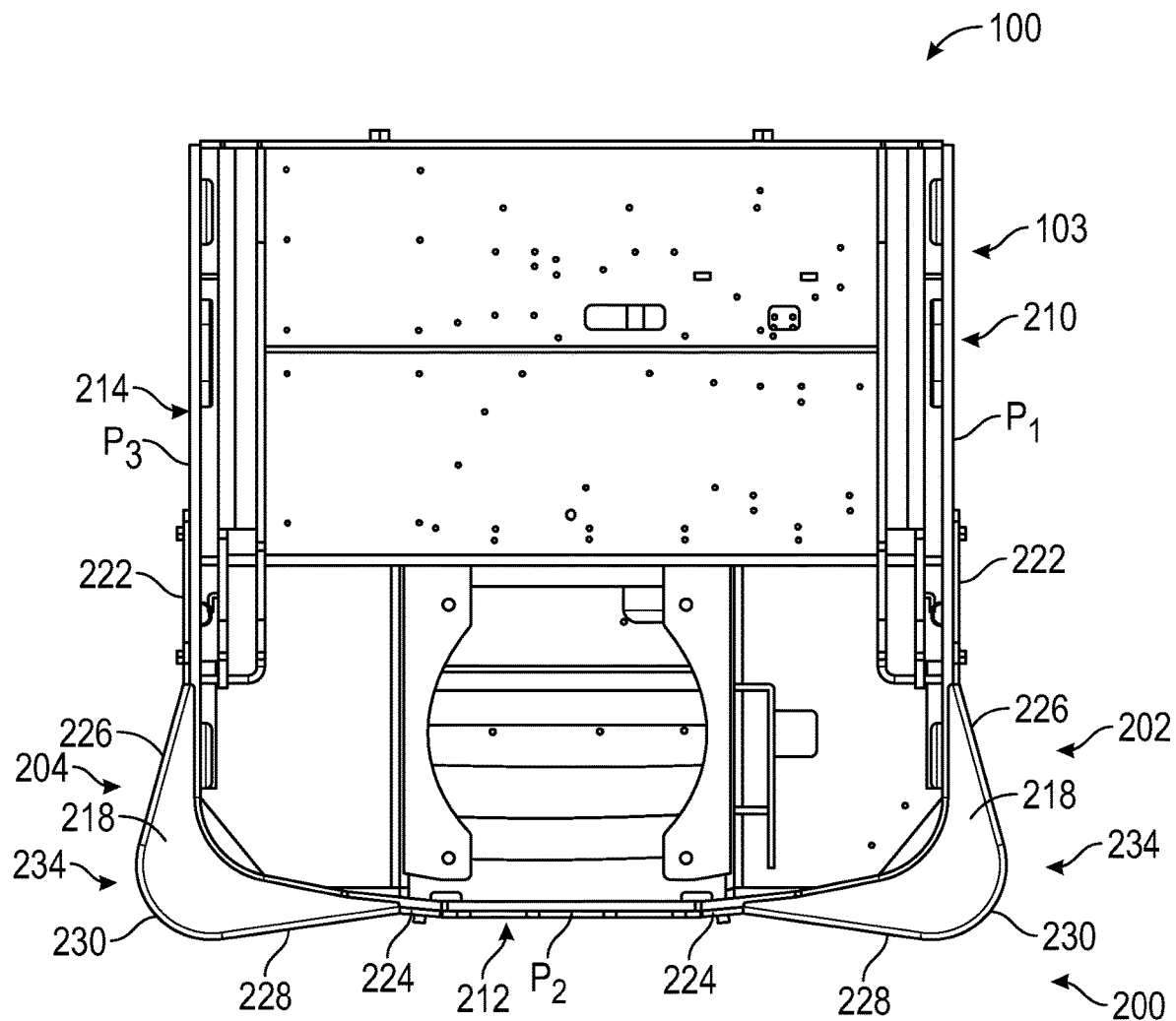
FIG. 10 is a top plan view of the material handling vehicle and the multi-piece bumper assembly of FIG. 8.
Figure 11:
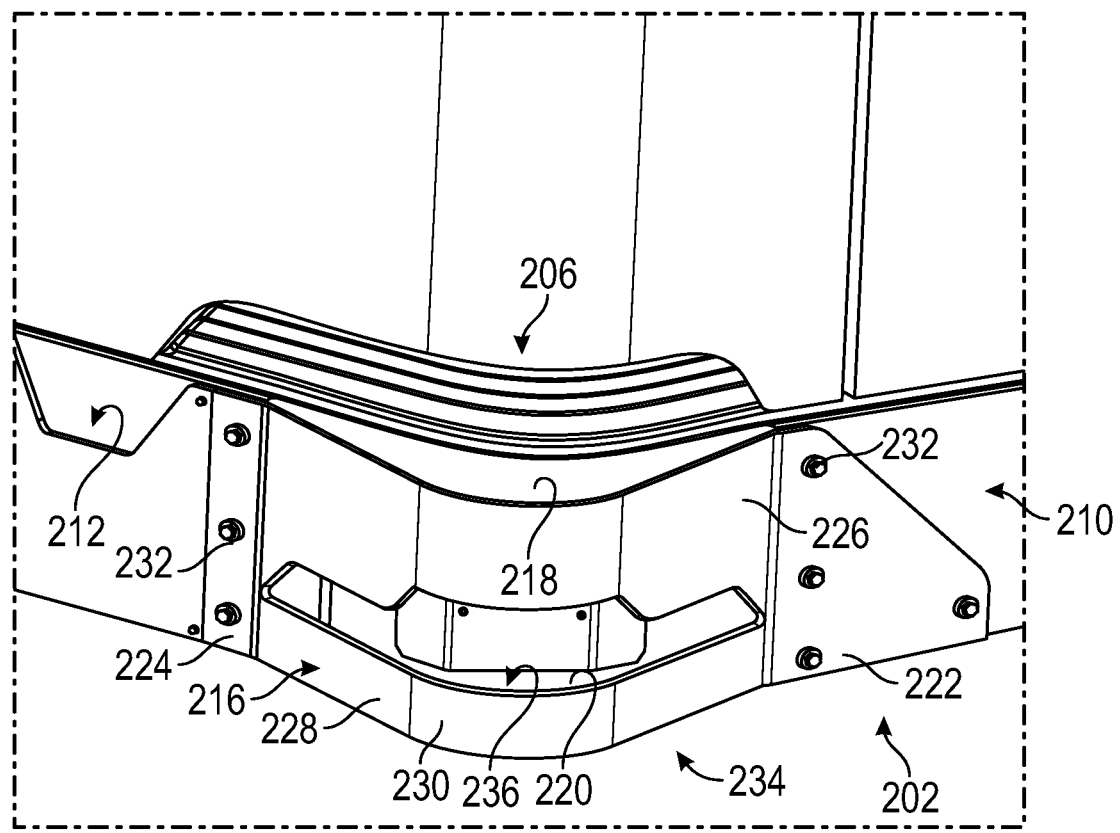
FIG. 11 is a top, front, left isometric view of a first bumper of the multi-piece bumper assembly of FIG. 8.

In general, the second bumper 104 and the third bumper 106 may be mirror images of one another. Thus, the third bumper 106 includes all the features of the second bumper 104 in mirror image, and the following description of the second bumper 104 also applies reflectively to the third bumper 106. With reference to FIGS. 6 and 7, the second bumper 104 can include a first plate 172, a second plate 174, and a third plate 176. The first plate 172 can include a first end portion 182, a second end portion 184, a middle portion 186, a first sloped portion 188, a second sloped portion 190, a first transition portion 192, a second transition portion 194, a third transition portion 196, a fourth transition portion 198, and an upper edge 197. The first end portion 182 and the second end portion 184 can define a plurality of fastener openings 199.

In some embodiments, the first plate 172 can be joined to the second plate 174 and the third plate 176 (e.g., welded, adhered, riveted, fastened, etc.). In some embodiments, the first plate 172, the second plate 174, and the third plate 176 are integral with one another (e.g., formed from a single piece of material via casting, molding, etc.). The first end portion 182 can be connected to the first transition portion 192. The first transition portion 192 can be connected to the first sloped portion 188. The first sloped portion 188 can be connected to the third transition portion 196. The third transition portion 196 can be connected to the middle portion 186. The middle portion 186 can be connected to the fourth transition portion 198. The fourth transition portion 198 can be connected to the second sloped portion 190. The second sloped portion 190 can be connected to the second transition portion 194. The second transition portion 194 can be connected to the second end portion 184.

In the illustrated embodiment, the first transition portion 192 can be concave, and the second transition portion 194, the third transition portion 196, and the fourth transition portion 198 can be convex. In general, the first plate 172 can be C-shaped. For example, the protruding portion 127 may be defined by and extend between the middle portion 186, the first sloped portion 188, and the second sloped portion 190. The first sloped portion 188 and the second sloped portion 190 may extend toward the middle portion 186. When the second bumper 104 is coupled to the vehicle frame 103, the protruding portion 127 may outwardly extend past a plane S defined by the side of the vehicle frame 103 to which the second bumper 104 is coupled.

The second plate 174 and the third plate can be generally trapezoidal to complement and correspond with the first plate 172. The second plate 174 and the third plate are generally perpendicular with the first plate 172. The second plate 174 and the third plate can be opposite and generally parallel with one another. The second plate 174 and the third plate can be joined to the first transition portion 192, the first sloped portion 188, the third transition portion 196, the middle portion 186, the fourth transition portion 198, and the second sloped portion 190.

In some embodiments, the second opening 120 can be defined in the middle portion 186 between the second plate 174 and the third plate. In some embodiments, the second opening 120 can be rectilinear. It should be understood that the second opening 120 may be any shape (e.g., polygonal, ovular, ovate, circular, etc.). It should also be understood that the second opening 120 may be defined by additional portions of the first plate 172 in addition to or instead of the middle portion 186.

In some embodiments, the second slot 122 can be defined in the first sloped portion 188, the third transition portion 196, the middle portion 186, the fourth transition portion 198, and the second sloped portion 190. In some embodiments, the second slot 122 can be a straight-sided oval. It should be understood that the second slot 122 may be any shape (e.g., polygonal, rectilinear, ovate, circular, etc.). It should also be understood that the second slot 122 may be defined by additional portions of the first plate 172 in addition to or instead the first sloped portion 188, the third transition portion 196, the middle portion 186, the fourth transition portion 198, and the second sloped portion 190.

In operation, the first bumper 102, the second bumper 104, and the third bumper 106 may be mounted to the vehicle frame 103 to respectively cover the first sensor set 110, the second sensor set 112, and the third sensor set 114. For example, the first plate 132, the second plate 134, and the third plate 136 of the first bumper 102 and the vehicle frame 103 may enclose the first sensor set 110. Similarly, the first plate 172, the second plate 174, and the third plate 176 of the second bumper 104/the third bumper 106 and the vehicle frame 103 may enclose the second sensor set 112 and the third sensor set 114.

From the foregoing, it will be appreciated that the above first, second, and third bumpers 102, 104, 106 cover sensors mounted on-board a MHV. In other embodiments, the multi-piece bumper assembly 101 may be designed to accommodate alternative sensor arrangements and/or may be designed to define alternative shapes or structures. For example, FIGS. 8-11 illustrate a bumper assembly 200 coupled to the MHV 100 according to the present disclosure. As illustrated in FIGS. 8-11, the bumper assembly 200 may include a first bumper 202 and a second bumper 204 coupled to opposing corners of the vehicle frame 103.

The first bumper 202 may cover a first corner 206 of the vehicle frame 103 and the second bumper 204 may cover a second corner 208 of the vehicle frame 103 laterally opposite to the first corner 206. For example, the first bumper 202 may wrap around the vehicle frame 103 from a first side 210 to a second side 212, which extends in a direction transverse relative to the first side 210. The second bumper 204 may wrap around the vehicle frame 103 from a third side 214, which is laterally separated from and arranged generally parallel to the first side 210, to the second side 212.

In general, the first bumper 202 may be designed similarly and symmetric to the second bumper 204. As such, the following description of the first bumper 202 may symmetrically apply to the second bumper 204. The first bumper 202 may include a first plate 216, a second plate 218, and a third plate 220. The second plate 218 and the third plate 220 may extend from opposing edges of the first plate 216 in a direction toward the vehicle frame 103. In some embodiments, the first plate 216 can be joined to the second plate 218 and the third plate 220 (e.g., welded, adhered, riveted, fastened, etc.). In some embodiments, the first plate 216, the second plate 218, and the third plate 220 can be integral with one another (e.g., formed from a single piece of material via casting, molding, etc.). The second plate 218 and the third plate 220 may be vertically separated from one another (e.g., in a direction perpendicular to a floor on which the MHV 100 travels).

The first plate 216 may include a first end portion 222, a second end portion 224, a first sloped portion 226, a second sloped portion 228 and a middle portion 230. The first end portion 222 and the second end portion 224 may be arranged at opposing distal ends of the first plate 216, and may include a plurality of openings 232 each configured to receive a fastener to facilitate coupling the first plate 216 to the vehicle frame 103. The middle portion 230 may be arranged between the first sloped portion 226 and the second sloped portion 228.

In general, the first sloped portion 226, the second sloped portion 228, and the middle portion 230 may combine to form a protruding portion 234 of the first bumper 204, which extends outwardly away from the vehicle frame 103. For example, the first sloped portion 226 may extend away from the first side 210 of the vehicle frame 103 at an angle to a junction between the first sloped portion 226 and the middle portion 230. The second sloped portion 228 may extend away from the second side 212 of the vehicle frame 103 at an angle to a junction between the second sloped portion 228 and the middle portion 230. The middle portion 230 may define a generally curved or rounded profile.

In general, the angled or sloped design of the first sloped portion 226 and the second sloped portion 228 may enable the protruding portion 234 to extend beyond the boundaries defined by the vehicle frame 103. For example, the first sloped portion 226 may extend beyond a first plane P1 defined by first side 210 of the vehicle frame 103 (the first sloped portion 226 of the second bumper 204 may extend beyond a third plane P3 defined by the third side 214 of the vehicle frame 103). The second sloped portion 228 may extend beyond a second plane P2 defined by the second side 212 of the vehicle frame 103.

The first plate 216 may include a slot or opening 236 extending therethrough. The slot 236 may extend along the first sloped portion 226, the second sloped portion 228, and the middle portion 230. In the illustrated embodiment, the slot 236 may increase in vertical height along the middle portion 230. The slot 236 may provide an opening through which a sensor (not shown) may project its field of view. The first plate 216, the second plate 218, and the third plate 220 of the first bumper 202 and the vehicle frame 103 may enclose the sensor (not shown).

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A material handling vehicle, comprising:
   a vehicle frame defining a first side, a second side opposite to the first side, and a third side extending transverse to the first side;

a first bumper coupled to the first side and including a first slot extending along a portion of the first bumper and a first protruding portion, wherein the first protruding portion extends outwardly at an angle past a plane defined by the first side of the vehicle frame; and a second bumper coupled to the second side of the vehicle frame, the second bumper including a second slot extending along a portion of the second bumper and a second protruding portion, wherein the second protruding portion extends outwardly at an angle past a plane defined by the second side of the vehicle frame, wherein the first protruding portion is formed by a first sloped portion, a second sloped portion, and a middle portion, the middle portion curving from the first sloped portion to the second sloped portion.

2. The material handling vehicle of claim 1, wherein the first slot extends along at least a portion of both of the first sloped portion and the second sloped portion and through the middle portion.

3. The material handling vehicle of claim 1, wherein the second protruding portion is formed by a first sloped portion, a second sloped portion and a middle portion arranged between the first sloped portion and the second sloped portion.

4. The material handling vehicle of claim 3, wherein the second slot extends along at least a portion of both of the first sloped portion and the second sloped portion and through the middle portion.

5. The material handling vehicle of claim 1, wherein the first bumper wraps around the vehicle frame from the first side to the third side.

6. The material handling vehicle of claim 5, wherein the second bumper wraps around the vehicle frame from the third side to the second side.

7. The material handling vehicle of claim 1, wherein the first slot and the first protruding portion are formed in a first plate of the first bumper, and wherein the first bumper further includes a second plate and a third plate extending from opposing edges of the first plate in a direction toward the vehicle frame.

8. The material handling vehicle of claim 1, wherein the second slot and the second protruding portion are formed in a first plate of the second bumper, and wherein the second bumper further includes a second plate and a third plate extending from opposing edges of the first plate in a direction toward the vehicle frame.

9. The material handling vehicle of claim 1, wherein the first bumper and the second bumper each enclose an object detection sensor.

* * * * *